US009580927B1

(12) United States Patent
Heil et al.

(10) Patent No.: US 9,580,927 B1
(45) Date of Patent: Feb. 28, 2017

(54) DEVICE FOR DISPLAYING DECORATIVE ITEMS ON GRAVE MARKER

(71) Applicants: Charles Christopher Heil, Norborne, MO (US); Deborah A. Heil, Norborne, MO (US); Charles N. Heil, Norborne, MO (US)

(72) Inventors: Charles Christopher Heil, Norborne, MO (US); Deborah A. Heil, Norborne, MO (US); Charles N. Heil, Norborne, MO (US)

(73) Assignees: Charles Christopher Heil, Norborne, MO (US); Deborah A. Heil, Norborne, MO (US); Charles N. Heil, Norborne, MO (US)

( * ) Notice: Subject to any disclaimer, the term of this patent is extended or adjusted under 35 U.S.C. 154(b) by 0 days.

(21) Appl. No.: 15/248,990

(22) Filed: Aug. 26, 2016

Related U.S. Application Data

(60) Provisional application No. 62/210,059, filed on Aug. 26, 2015.

(51) Int. Cl.
  *E04H 13/00* (2006.01)
  *A61G 99/00* (2006.01)
  *F16M 13/02* (2006.01)
(52) U.S. Cl.
  CPC ............. *E04H 13/001* (2013.01); *A61G 99/00* (2013.01); *F16M 13/022* (2013.01)

(58) Field of Classification Search
  CPC ....... A61G 99/00; F16M 13/022; E04H 13/00; E04H 13/001; E04H 13/003
  USPC ........................ 27/1; 52/103, 104; 40/124.05
  See application file for complete search history.

(56) References Cited

U.S. PATENT DOCUMENTS

| | | | | |
|---|---|---|---|---|
| 2,148,660 | A * | 2/1939 | Sweeney | E04H 13/00 40/124.5 |
| 5,454,178 | A * | 10/1995 | Rivard | G09F 7/18 248/535 |
| 5,517,790 | A * | 5/1996 | Jennings | E04H 13/003 47/79 |
| 6,338,211 | B1 * | 1/2002 | Carney | G09F 7/18 248/156 |
| 6,637,911 | B2 * | 10/2003 | Sittner | A47G 33/06 362/183 |
| 7,934,690 | B1 * | 5/2011 | Walter | E04H 13/001 248/539 |
| 8,209,891 | B2 * | 7/2012 | Shellhouse | E04H 13/003 116/173 |
| 2003/0221377 | A1 * | 12/2003 | Crawford | E04H 13/003 52/103 |
| 2010/0313492 | A1 * | 12/2010 | Shellhouse | E04H 13/003 52/103 |
| 2016/0047138 | A1 * | 2/2016 | McCaslin | E04H 13/001 52/103 |

* cited by examiner

*Primary Examiner* — William Miller
(74) *Attorney, Agent, or Firm* — Polsinelli PC

(57) ABSTRACT

A device for displaying items on a grave marker and a method for using the device are described.

6 Claims, 2 Drawing Sheets

DEVICE FOR DISPLAYING DECORATIVE ITEMS ON GRAVE MARKER

CROSS REFERENCE TO RELATED APPLICATION

This application claims priority from U.S. Provisional Application Ser. No. 62/210,059, filed on Aug. 26, 2015, which is hereby incorporated by reference in its entirety.

FIELD OF THE INVENTION

The present invention relates generally to a device for displaying items. More particularly, the present invention relates to a device that is affixed to a grave marker, gravestone, or headstone, and which contains a structure for securing, receiving, attaching and/or positioning items for display.

BACKGROUND OF THE INVENTION

Grave markers such as headstones, gravestones, or tombstones are traditionally used to mark the burial site or gravesite of deceased beings, for example, people or pets. In many cultures loved ones of the deceased will decorate the gravesites as symbol of remembrance and respect by placing items or memorabilia on or about the grave marker or headstone located within a cemetery. These display items may be in the form of plants or flowers, wreaths, vases, urns, flags, picture frames, banners, crosses, stuffed animals, etc. These display items are routinely placed on or inserted into the lawn space in front of, next to, or behind the grave marker.

Cemeteries traditionally have manicured lawns which require routine mowing and trimming at regular intervals. Lawn mowers and weed trimmers are used for maintaining the cemetery lawn. When decorations are placed around a grave marker, the yard keeper or landscaper must remove the decoration in order to tend to the lawn. It is common practice in cemeteries for the yard keeper to simply discard the decoration once it has been removed for mowing because considerable time would be spent replacing the items that have been uplifted from the ground during the mow. This means that the decorations placed at a gravesite by a loved one will only be on display between mowings. This is frustrating for loved ones when considerable time, expense, and/or effort is made to adorn a grave site with decorative items or when the items are sentimental.

Some grave markers also contain holes drilled directly on the marble stone, but the holes are limited in number which greatly restricts the number of display items that may be placed on display at a given time.

Therefore, it would be desirable to have a device for positioning, receiving, storing and/or securely displaying items for display at a gravesite and which device easily and securely attaches directly to a grave marker, and is configured to display a number of items until the items are removed by the user.

SUMMARY OF THE INVENTION

The present invention relates to a device for displaying items. Specifically, the device for displaying items on a grave marker comprises a platform having a top surface, a bottom surface, and a sidewall; a receiving channel interconnecting the platform top surface and bottom surface, the receiving channel configured to receive and support a first item for display; the platform top surface including a securing member configured to secure a second display item to the top surface of the platform; the platform sidewall including a fastening channel positioned to communicate with the receiving channel; a fastener received within the fastening channel and extending into the receiving channel to fasten the first display item within the receiving channel; the platform sidewall further including a lower margin having an opening; and the platform bottom surface including a drainage groove in communication with the receiving channel and the sidewall opening and configured to direct the flow of liquids from beneath the platform and outwardly through the sidewall opening.

The present invention further provides for a method of displaying items on a grave marker using the device of the present invention. The method preferably comprises the steps of (a) affixing a device to a grave marker, gravestone or headstone, the device comprising a platform having a top surface, a bottom surface, and a sidewall; a receiving channel interconnecting the platform top surface and bottom surface, the receiving channel configured to receive and support a first item for display; the platform top surface including a securing member configured to secure a second display item to the top surface of the platform; the platform sidewall including a fastening channel positioned to communicate with the receiving channel; a fastener received within the fastening channel and extending into the receiving channel to fasten the first display item within the receiving channel; the platform sidewall further including a lower margin having an opening; and the platform bottom surface including a drainage groove in communication with the receiving channel and the sidewall opening and configured to direct the flow of liquids from beneath the platform and outwardly through the sidewall opening; (b) inserting the first display item into the receiving channel; and (c) securing the second display item to the securing member.

BRIEF DESCRIPTION OF DRAWINGS

The foregoing and other objects, features and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE INVENTION

Figure 1:
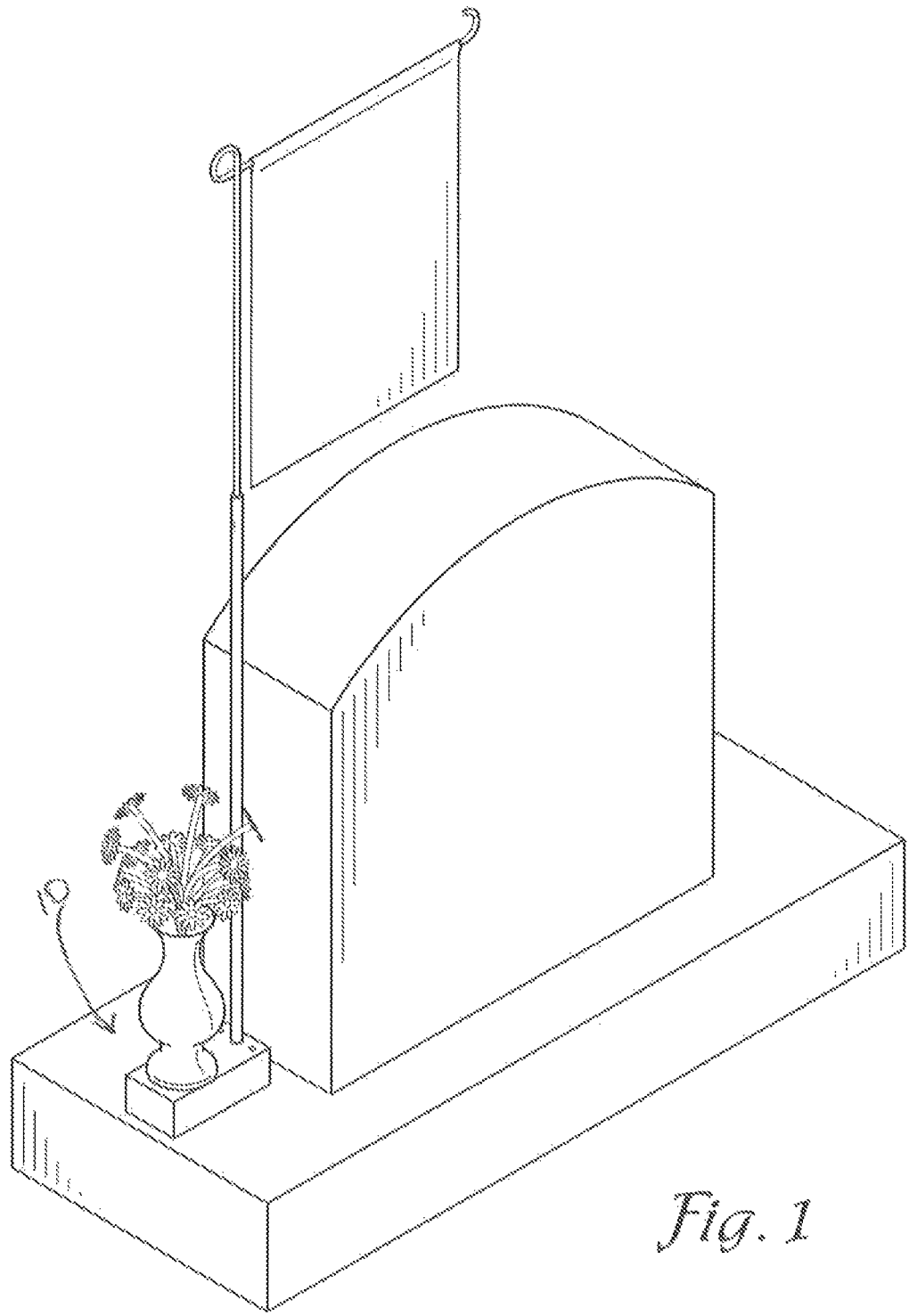
FIG. 1 is a perspective view of the device in use.
Figure 2:
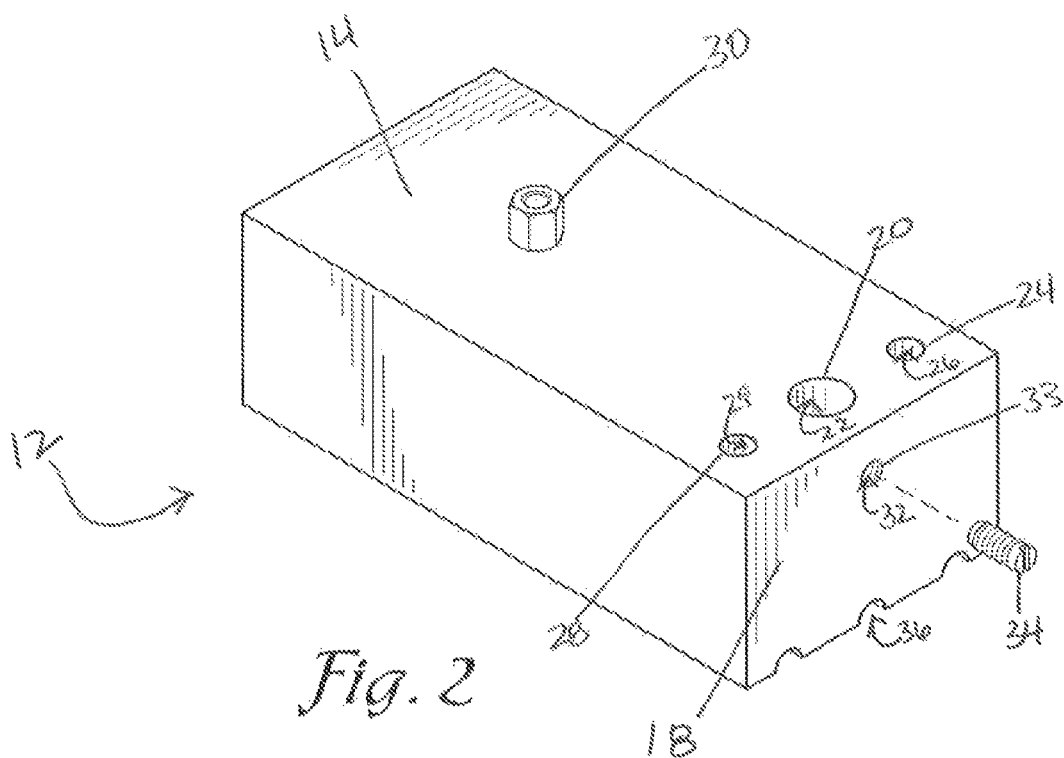
FIG. 2 is a side perspective view of the device platform.
Figure 3:
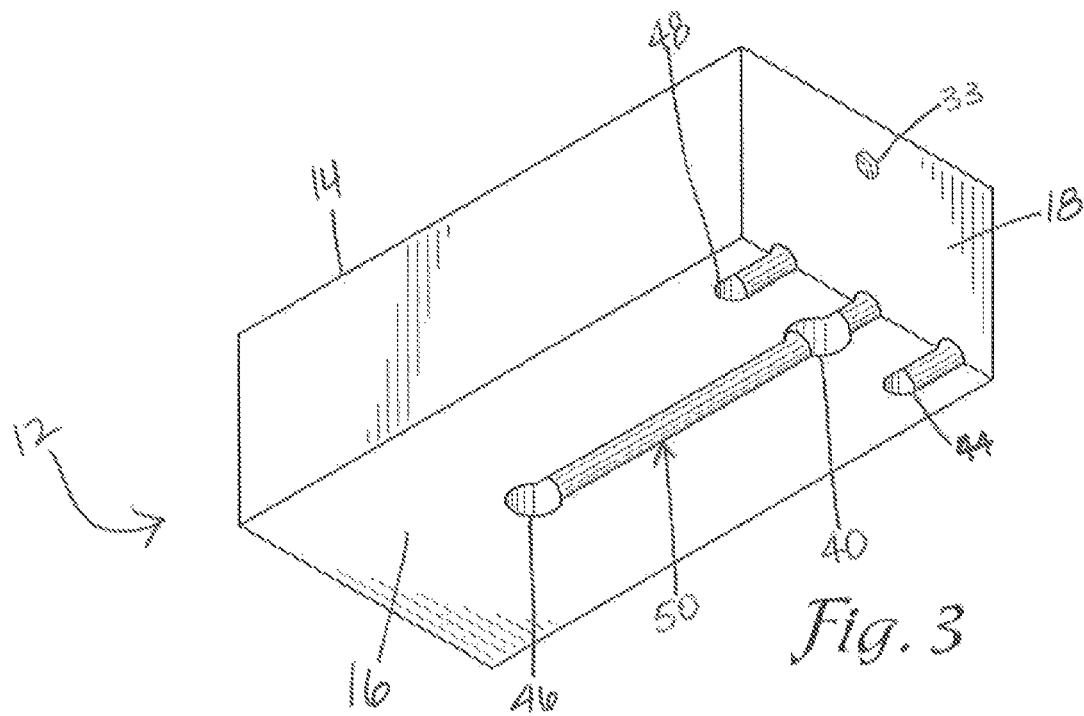
FIG. 3 is a bottom perspective view of the device platform.

A device 10 according to the present invention is depicted in FIGS. 1-3. As illustrated in FIG. 2, the device 10 comprises a platform 12 having a top surface 14, a bottom surface 16, and a sidewall 18. Preferably, the platform 12 is quadrilateral in shape, but other shapes for the platform would be readily apparent to one of skill in the art, such as, for example, spherical or cylindrical shapes. The platform 12 may have dimensions of between about 2 inches to about 6 inches in width, between about 2 inches to about 10 inches in length, and about 2 inches to about 12 inches in height. In a preferred embodiment, the platform 12 is about 4 inches by 6 inches by 4 inches. The platform 12 can be of any size and shape suitable to have a variety of display items removably attached to the top surface and the bottom surface mounted to grave marker.

The platform 12 can be made from any sturdy, durable material known in the art. Preferably, the platform 12 is made from a material selected from the group consisting of, but not limited to, stainless steel, aluminum, glass, plastic, acrylic, a synthetic plastic resin, fiberglass, polyvinyl chloride, metal, ceramic, concrete, foam, combinations thereof and/or the like. Any sturdy material that is suitable for outdoor use and is able to withstand the weather elements, such as rain, wind, heat and snow is preferred, and aluminum is especially preferred. Alternatively, the platform may be fabricated from a material that has been treated with a chemical to ensure durability in all-weather elements. The platform may be solid or hollow.

Referring again to FIG. 2, the platform 12 additionally comprises a structure for positioning, securing, receiving, and/or supporting items for display. The structure may be any suitable structure for positioning, securing and/or displaying items to an exterior surface of the platform 12. The structure is configured to position, secure, receive, attach, and/or support any suitable number and variety of items on the device 10 such as, for example, fresh cut flower bouquets, artificial flower bouquets, wreaths, vases, urns, garden flag holders, posters, picture frames, stuffed animals, and/or the like, as is shown for example in FIG. 1. In a preferred embodiment, the structure for positioning, securing, receiving, and/or supporting items is a receiving channel 22, securing member 30, or combination thereof. A combination of structures are preferred to allow for different types of items to be secured to or received by the platform, for example, fresh or artificial flower bouquets, vases, flag posts, wreaths, signs or banners, or the like. However, any combination of structures or a single type of structure may be used with the present invention. A structure for positioning, securing, receiving, and/or supporting items may be positioned on one or more exterior surfaces the platform 12. In one embodiment, a structure for positioning, securing, receiving, and/or supporting items for display on the platform is positioned on the top surface 14 and a sidewall 16, as illustrated in FIGS. 2-3.

In one embodiment, the platform comprises a receiving channel 22 configured to receive and support an item for display. A receiving channel 22 may be formed by drilling into or through the platform 12 on one or more exterior surfaces. In one embodiment, the receiving channel 22 is drilled through the platform 12 in one or more locations to interconnect two opposing platform surfaces, such as the top and bottom surfaces 14, 16, as illustrated in FIGS. 2 and 3, thereby forming two receiving channel openings 20, 40. The platform 12 may also include additional receiving channels 26, 29, and receiving channel openings, 24, 28, 44, 48, as depicted in FIGS. 2 and 3. In one embodiment, the interior surface of the receiving channel 22 is smooth as shown in FIG. 2. Alternatively, the interior of the receiving channel can be threaded to be operatively coupled to a display item having a threaded base or pole portion for further securement within the platform 12.

When a receiving channel is used, the platform may additionally comprise a fastening channel opening 33 extending from a platform sidewall 18 into a receiving channel 22, thereby forming a fastening channel 32. The fastening channel 32 may be threaded and configured to receive a second fastener 34, such as a set screw, to fasten or clamp a display item that has been received within the receiving channel 22. Alternatively, the fastening channel may be smooth and configured to receive a non-threaded fastener, such as a dowel.

Additionally or alternatively, the platform also comprises a securing member 20 configured to secure or attach a display item to the top surface 14 of the platform 12, as illustrated in FIG. 2. The securing member 20 may be any suitable article for securing or attaching an item, such as hooks, clips, fasteners, magnets, Velcro® adhesive pads, suction elements, and/or the like. Preferably, the securing member 20 is a fastener, such as a nut, a screw, dowel, and combinations thereof.

The structure for positioning, securing, receiving, and/or supporting items for display can be located anywhere on an exterior surface of the platform 12. In a preferred embodiment, the structure for positioning, securing, receiving, and/or supporting items is located on the top surface 14 of the platform 12, as illustrated in FIG. 2. One of skill in the art will appreciate that the at least one structure for positioning, securing, receiving, and/or supporting items may be positioned on more than one exterior surface of the platform and may also be positioned at different points along one or more exterior surfaces of the platform.

Referring now to FIG. 3, the bottom surface 16 of the platform 12 may comprise a drainage groove 50. The drainage groove 50 is in communication with the receiving channel 22 and the fastening channel 32 and is configured to direct the flow of liquids from beneath the platform 12 and outwardly through a sidewall opening 36 located on the lower margin of the platform sidewall 18.

A method for display items on a grave marker is also disclosed. The method generally includes (a) affixing a device to the grave marker, the device comprising: a platform having a top surface, a bottom surface, and a sidewall; a receiving channel interconnecting the platform top surface and bottom surface, the receiving channel configured to receive and support a first item for display; the platform top surface including a securing member configured to secure a second display item to the top surface of the platform; the platform sidewall including a fastening channel positioned to communicate with the receiving channel; a fastener received within the fastening channel and extending into the receiving channel to fasten the first display item within the receiving channel; the platform sidewall further including a lower margin having an opening; and the platform bottom surface including a drainage groove in communication with the receiving channel and the sidewall opening and configured to direct the flow of liquids from beneath the platform and outwardly through the sidewall opening; (b) inserting the first display item into the receiving channel; and (c) securing the second display item to the securing member.

The device may be affixed to a grave marker by any permanent or removable attachment means known in the art, including adhesive or epoxy bonding agent, a cement or concrete bonding agent, a non-permanent bonding agent, a fastener, or the like. In one embodiment, an adhesive or bonding agent may be applied to the bottom surface of the platform prior to affixing the device to the grave marker. Depending on the type of adhesive used, the attachment of the device to the grave marker may be permanent or removable. In another embodiment, a fastener may be inserted into an attachment opening 46 located on the bottom surface 16 of the platform. The fastener may then be placed in communication with a corresponding securing member that has been mounted to the grave marker, thereby enabling the device to be removably affixed to the grave marker.

Thus, a display device for displaying items and method of use have been described. It will be apparent to those skilled in the art, however, that many changes, variations, modifications, other uses, and applications to the device and method for using are possible, and also such changes, variations, modifications, other uses, and applications which do not depart from the spirit and scope of the invention are deemed to be covered by the invention, which is limited only by the claims which follow.

What is claimed is:

1. A device for displaying items on a grave marker, the device comprising:
   a platform having a top surface, a bottom surface, and a sidewall;
   a receiving channel interconnecting the platform top surface and bottom surface, the receiving channel configured to receive and support a display item;
   the platform top surface including a securing member configured to secure the display item to the top surface of the platform;
   the platform sidewall including a fastening channel positioned to communicate with the receiving channel;
   a fastener received within the fastening channel and extending into the receiving channel to fasten the display item within the receiving channel;
   the platform sidewall further including a lower margin having an opening; and
   the platform bottom surface including a drainage groove in communication with the receiving channel and the sidewall opening and configured to direct the flow of liquids from beneath the platform and outwardly through the sidewall opening.

2. The device of claim 1, wherein the platform is made from a material selected from the group comprising aluminum, stainless steel, glass, plastic, acrylic, a synthetic plastic resin, fiberglass, polyvinyl chloride, metal, ceramic, concrete, foam, and combinations thereof.

3. The device of claim 2, wherein the platform is aluminum.

4. The device of claim 1, wherein the platform is quadrilateral in shape.

5. A method of displaying items on a grave marker, the method comprising the steps of:
   a. affixing a device to the grave marker, the device comprising:
      a platform having a top surface, a bottom surface, and a sidewall;
      a receiving channel interconnecting the platform top surface and bottom surface, the receiving channel configured to receive and support a first display item;
      the platform top surface including a securing member configured to secure a second display item to the top surface of the platform;
      the platform sidewall including a fastening channel positioned to communicate with the receiving channel;
      a fastener received within the fastening channel and extending into the receiving channel to fasten the first display item within the receiving channel;
      the platform sidewall further including a lower margin having an opening; and
      the platform bottom surface including a drainage groove in communication with the receiving channel and the sidewall opening and configured to direct the flow of liquids from beneath the platform and outwardly through the sidewall opening;
   b. inserting the first display item into the receiving channel; and
   c. securing the second display item to the securing member.

6. The method of claim 5, wherein a bonding agent is applied to the bottom surface of the platform for affixing the device to the grave marker.

* * * * *